(12) United States Patent
Maher

(10) Patent No.: US 7,983,681 B2
(45) Date of Patent: Jul. 19, 2011

(54) SYSTEM AND METHOD FOR ENHANCING INTEROPERABILITY BETWEEN MOBILE COMMUNICATION SYSTEM COMPONENTS USING DIFFERENT AUDIO ENCODING FORMATS

(75) Inventor: John W. Maher, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 901 days.

(21) Appl. No.: 11/535,802

(22) Filed: Sep. 27, 2006

(65) Prior Publication Data

US 2008/0075044 A1 Mar. 27, 2008

(51) Int. Cl.
*H04W 40/00* (2009.01)
*H04H 20/71* (2008.01)

(52) U.S. Cl. .......... 455/445; 455/3.01; 455/7; 455/13.1; 455/11.1; 370/315; 370/312; 370/349

(58) Field of Classification Search ................ 370/315, 370/310, 349, 312
See application file for complete search history.

(56) References Cited

U.S. PATENT DOCUMENTS

| | | | | |
|---|---|---|---|---|
| 5,987,331 | A * | 11/1999 | Grube et al. | 455/509 |
| 6,298,058 | B1 * | 10/2001 | Maher et al. | 370/390 |
| 6,647,020 | B1 * | 11/2003 | Maher et al. | 370/432 |
| 7,333,826 | B2 * | 2/2008 | Siegel | 455/518 |
| 2004/0153316 | A1 * | 8/2004 | Hardwick | 704/214 |

FOREIGN PATENT DOCUMENTS

EP 1686750 A 8/2006

* cited by examiner

*Primary Examiner* — Huy Phan
(74) *Attorney, Agent, or Firm* — Terri S. Hughes; Valerie M. Davis

(57) ABSTRACT

A system and method for improving the interoperability of communication system components using multiple audio encoding formats within a single talkgroup is provided. The system includes at least two base site repeaters, each of which may be configured to receive and process voice calls from communication units using different audio encoding formats. The system also includes a transcoder provided at either the base sites or as a separate infrastructure server. When a voice call is transmitted to a first repeater using a first audio encoding format, the audio signal is transcoded by the transcoder and provided to a second repeater using a second audio encoding format. The second repeater then broadcasts the voice call to any communication unit within range using the second audio encoding format.

20 Claims, 8 Drawing Sheets

SYSTEM AND METHOD FOR ENHANCING INTEROPERABILITY BETWEEN MOBILE COMMUNICATION SYSTEM COMPONENTS USING DIFFERENT AUDIO ENCODING FORMATS

TECHNICAL FIELD OF THE DISCLOSURE

This disclosure relates generally to mobile communications systems, and more particularly to a system and method for enhancing interoperability between mobile communication system components using different audio encoding formats.

Communication systems typically include a plurality of dispatch consoles and communication units, such as mobile or portable radio units, that are geographically distributed among various base sites and console sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among multiple sites. The zone controller may reside within a single device or multiple devices and may be located at a fixed equipment site or may be distributed among the base sites.

One set of industry standards commonly used for communication systems is referred to as Project 25, developed by the Association of Public Communications Officials (APCO). Currently, Project 25 communication systems support a series of standards commonly referred to as Phase 1. Phase 1 communication systems use frequency division multiple access (FDMA) to transmit digital data within a 12.5 kHz bandwidth channel. These systems are also designed to employ improved multi-band excitation (IMBE) vocoders that encode voice information for digital transmission at 7200 bits per second (also referred to as "full-rate").

Recently, the development of APCO Phase 2 systems has begun. Phase 2 communication systems use time division multiple access (TDMA) to provide two separate voice channels within a 12.5 kHz bandwidth channel and employ advanced multi-band excitation (AMBE) vocoders capable of encoding voice information at a more efficient 3600 bits per second (also referred to as "half-rate"). In order to provide interoperability between Phase 1 and Phase 2 systems, AMBE vocoders are also capable of encoding voice information using the full-rate format, thus allowing Phase 2 communication to both receive and transmit voice calls using Phase 1 compliant standards.

When voice calls are made within a single talkgroup having both Phase 1 and Phase 2 communication units, restrictions are imposed on the base site channel assignments to ensure that all the communication units in the talkgroup can hear the call. Specifically, the Phase 2 base sites and communication units are restricted to using the full-rate encoding format so that Phase 1 communication units are capable of receiving and processing the call. As a result, Phase 2 communication units in the talkgroup are unable to utilize the more efficient half-rate encoding format if any Phase 1 communication units are present in the same talkgroup.

Accordingly, there is a need for a system and method that provides enhanced interoperability between communication units using different vocoders, and thus different audio encoding formats, within a single talkgroup.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

A system and method for improving the interoperability of communication system components using multiple audio encoding formats within a single talkgroup is disclosed. In general, the system includes at least two base sites. Each base site includes at least one repeater, each of which may be configured to receive and process voice calls from communication units using different audio encoding formats. The system also includes a transcoder provided at either the base sites or as a separate infrastructure server. When a voice call is transmitted to a first repeater using a first audio encoding format, the audio signal is transcoded by the transcoder and provided to a second repeater using a second audio encoding format. The second repeater then broadcasts the voice call to any communication unit within range using the second audio encoding format. If the voice call is encrypted, the transcoder may also decrypt the audio signal, and then re-encrypt the audio signal following the transcoding process.

Several embodiments implementing the present disclosure are discussed in reference to figures below. For clarity and exemplary purposes only, the following description and examples assume a mixed FDMA/TDMA system using both APCO Phase 1 and Phase 2 compliant communication units, but other types of systems using different standards and protocols may also be used. Let us now refer to the figures to describe the present disclosure in greater detail.

Figure 1:
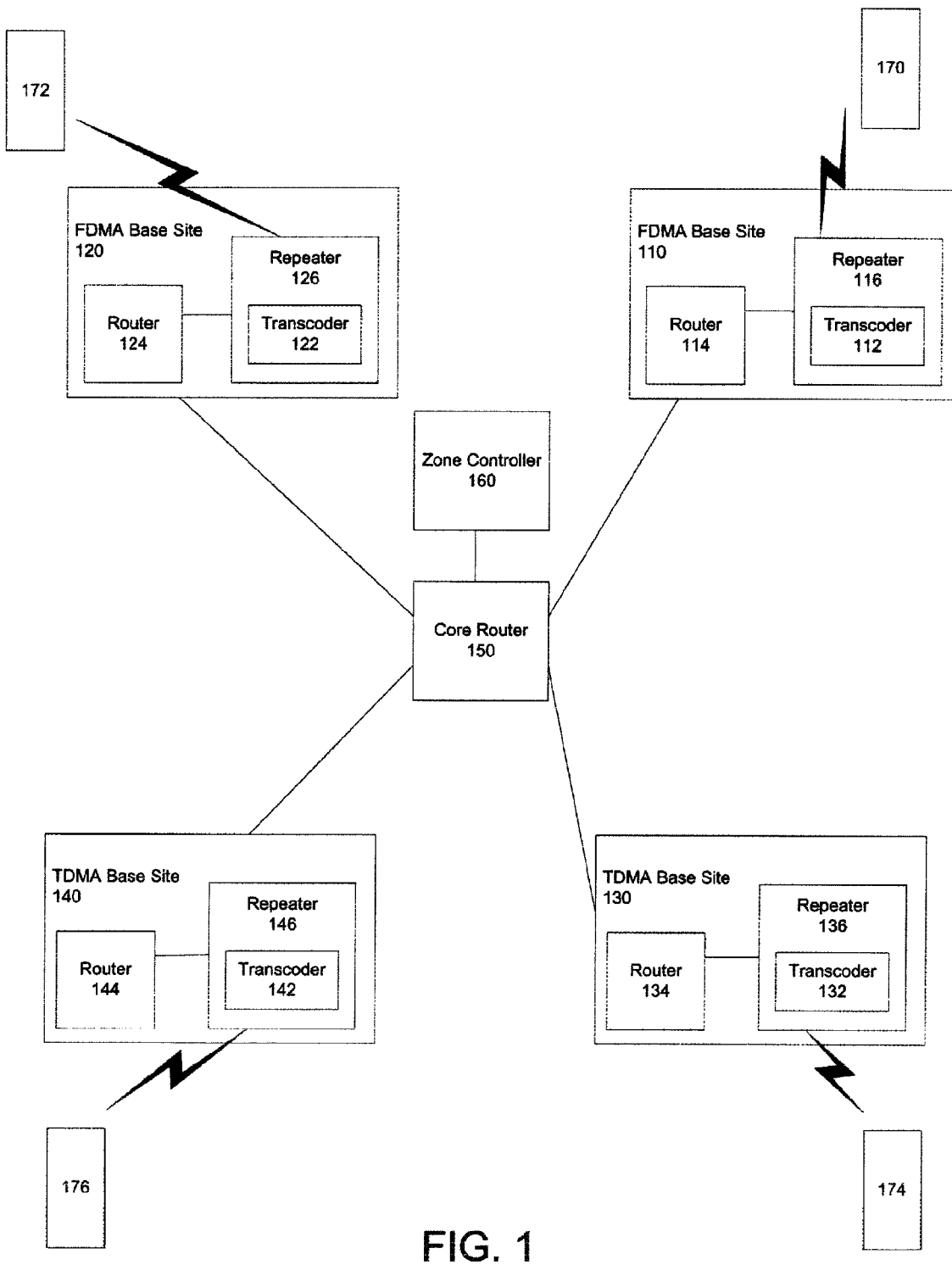
FIG. 1 shows one embodiment of a communication system according to the present disclosure.

FIG. 1 shows a communication system according to one embodiment of the present disclosure. The system includes a first FDMA base site 110, a second FDMA base site 120, a first TDMA base site 130, and a second TDMA base site 140. For purposes of the following description, a FDMA base site is an APCO Phase 1 compliant base site configured to transmit and receive full-rate encoded audio signals (i.e. audio signals encoded by an IMBE vocoder at 7200 bits per second). A TDMA base site is an APCO Phase 2 compliant base site configured to transmit and receive both half-rate encoded audio signals (i.e., audio signals encoded by an AMBE vocoder at 3600 bits per second) as well as Phase 1 compatible full-rate encoded audio signals.

Each of the base sites 110, 120, 130, and 140 includes a router 114, 124, 134, and 144 that is logically coupled to a core router 150, which is then further coupled to a zone controller 160. The zone controller 160 manages and assigns control information and Internet protocol (IP) multicast addresses for payloads (voice, data, video, etc.) sent between and among the base sites 110, 120, 130 and 140 and core router 150.

Each base site 110, 120, 130, and 140 also include at least one repeater 116, 126, 136, and 146 respectively coupled to the associated router 114, 124, 134, and 144. Each repeater 116, 126, 136, and 146 is also in wireless communication with a respective communication unit (which may be mobile or portable radio units) 170, 172, 174, and 176. In one embodiment, communication units 170 and 172 are Phase 1 compliant units having IMBE vocoders capable of encoding and receiving voice calls using the full-rate encoding format. Communication units 174 and 176 are Phase 2 compliant units having AMBE vocoders capable of encoding and receiving voice calls using the half-rate encoding format or the full-rate encoding format.

In one embodiment, each of the repeaters 116, 126, 136, and 146 at the base sites also includes a transcoder 112, 122, 132, and 142, respectively. Of course, it is understood that each transcoder may alternatively be a stand-alone device coupled to the repeater. Each transcoder 112, 122, 132, and 142 is capable of transcoding half-rate encoded audio to full-rate encoded audio, and/or vice-versa.

Although one embodiment of a communication system is shown in FIG. 1, it will be appreciated that the system may also contain many other elements. For example, the system may contain other base sites. Each base site may also be in wireless communication with additional communication units. Some FDMA base sites may also be in wireless communication with Phase 2 communication units and some TDMA base sites may be in wireless communication with Phase 1 communication units.

Additionally, although each base site is illustrated having a single repeater, it is understood that multiple repeaters may be located at each base site. A single base site may also include both FDMA Phase 1 compliant repeaters and TDMA Phase 2 compliant repeaters.

Figure 2:
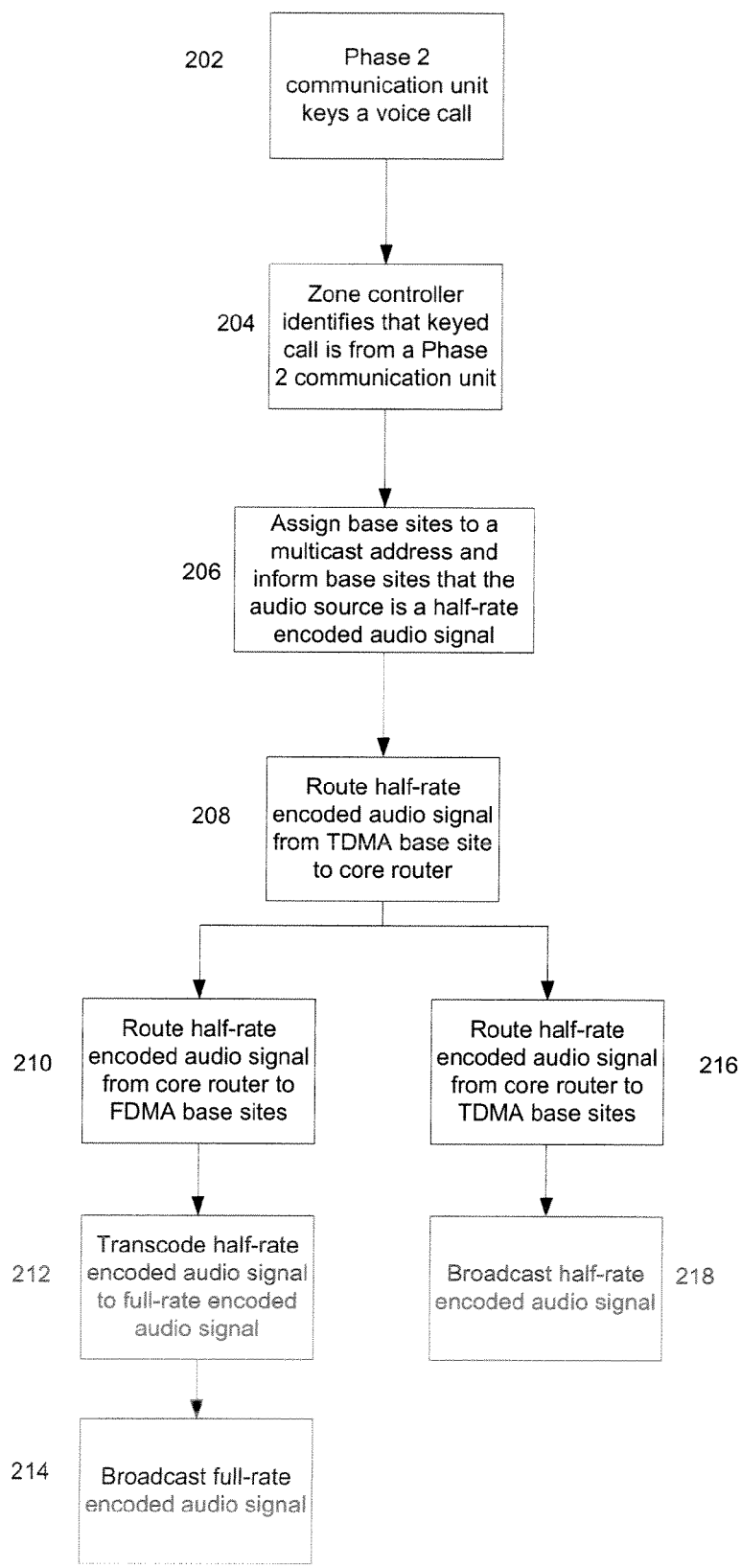
FIG. 2 shows one embodiment of a method for transmitting voice signals in the communication system of FIG. 1 according to the present disclosure.

FIG. 2 shows one embodiment of a method for transmitting a voice call from a Phase 2 communication unit in the system of FIG. 1. In step 202, Phase 2 communication unit 174, which is in wireless communication with the repeater 136 at the first TDMA base site 130, keys a voice call. In step 204, the zone controller 160 identifies that the keyed voice call was from a Phase 2 communication unit at a TDMA base site. In step 206, the zone controller 160 transmits a channel assignment message to each base site 110, 120, 130, and 140, assigning each of the base sites to use the same multicast address. The channel assignment message also informs each base site 110, 120, 130 and 140 that the audio source is going to be transmitted using the half-rate encoding format. In step 208, the first TDMA base site 130 routes a half-rate encoded audio signal received from the communication unit 174 to the core router 150.

In step 210, the core router 150 routes the half-rate encoded audio signal to the FDMA base sites 110 and 120. In step 212, the transcoders 112 and 122 at the FDMA base sites 110 and 120 transcode the half-rate encoded audio transmission into a full-rate encoded audio signal. In step 214, the repeaters 116 and 126 at the FDMA base sites 110 and 120 broadcast the full-rate encoded audio signal for reception by the Phase 1 communication units 170 and 172, respectively.

At the same time that the full-rate encoded audio signal is routed to the FDMA base sites in step 210, the core router 150 also routes the original half-rate encoded audio signal to the second TDMA base site 140 (step 216). Since the second TDMA base site 140 and the Phase 2 communication unit 176 are capable of receiving and processing half-rate encoded audio, there is no need to perform any transcoding at the second TDMA base site 140. Accordingly, in step 218, the repeater 146 at the second TDMA base site 140 broadcasts the half-rate encoded audio signal.

Figure 3:
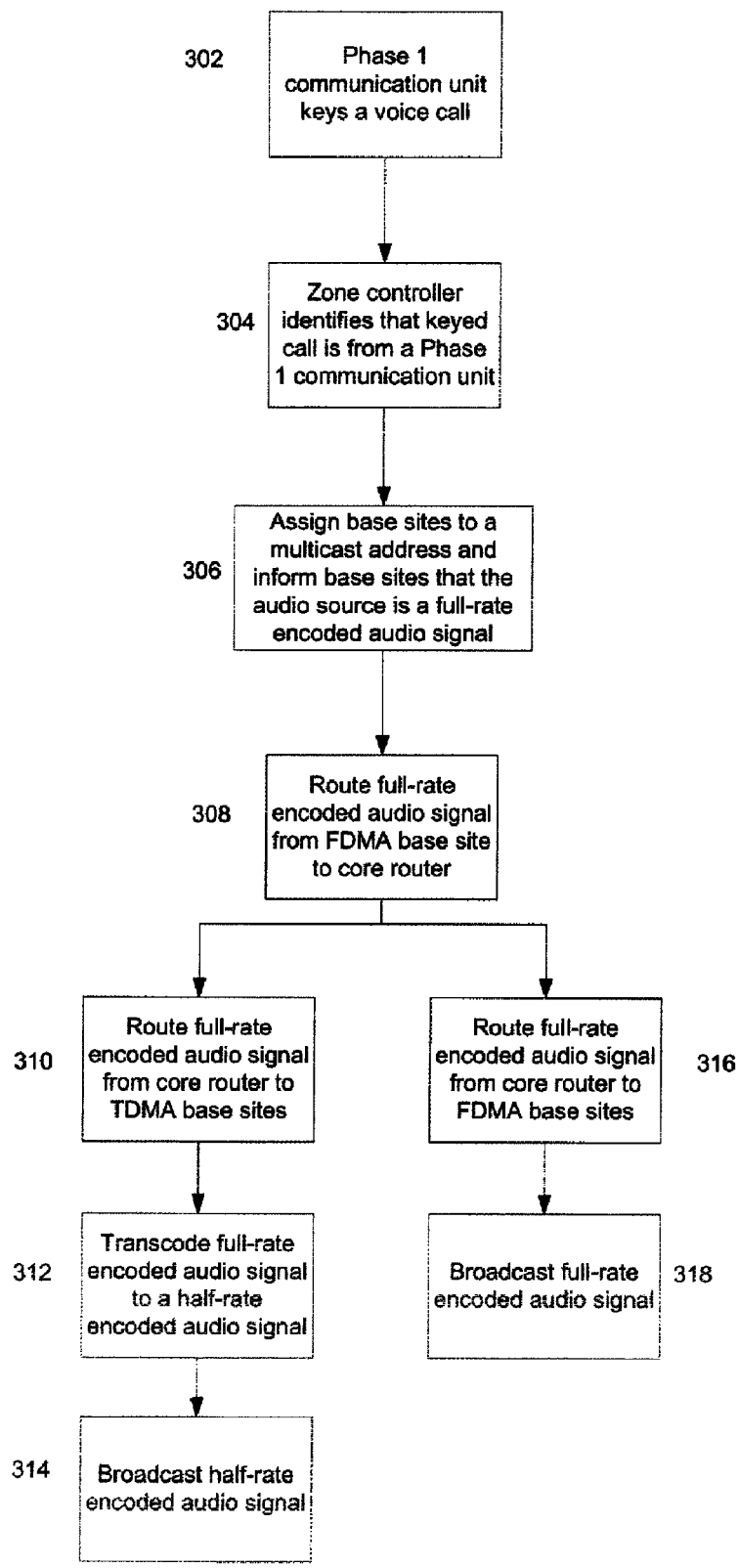
FIG. 3 shows another embodiment of a method for transmitting voice signals in the communication system of FIG. 1 according to the present disclosure.

FIG. 3 shows one embodiment of a method for transmitting a voice call from a Phase 1 communication unit in the system of FIG. 1. In step 302, the Phase 1 communication unit 170, which is in wireless communication with the repeater 116 at the first FDMA base site 110, keys a voice call. In step 304, the zone controller 160 identifies that the keyed voice call was from a Phase 1 communication unit. In step 306, the zone controller 160 transmits a channel assignment message to the base sites 110, 120, 130, and 140 assigning each of the base sites to use the same multicast address, and informing the base sites 110, 120, 130 and 140 that the audio source is going to be transmitted using the full-rate encoding format. In step 308, the first FDMA base site 110 routes the full-rate encoded audio signal received from the communication unit 170 to the core router 150.

In step 310, the core router 150 then routes the full-rate encoded audio transmission to the TDMA base sites 130 and 140. In step 312, the transcoders 132 and 142 at the TDMA base sites 130 and 140 transcode the full-rate encoded audio signal into a half-rate encoded audio signal. In step 314, the repeaters 136 and 146 at the TDMA base sites 130 and 140 broadcast the half-rate encoded audio signal for reception by the Phase 2 communication units 174 and 176, respectively.

At the same time that the half-rate encoded audio signal is routed to the TDMA base sites in step 310, the core router 150 also routes the original full-rate encoded audio signal to the second FDMA base site 120 in step 316. In step 318, the repeater 126 at the second FDMA base site 120 broadcasts the full-rate encoded audio signal for reception by the Phase 1 communication unit 172.

Figure 4:
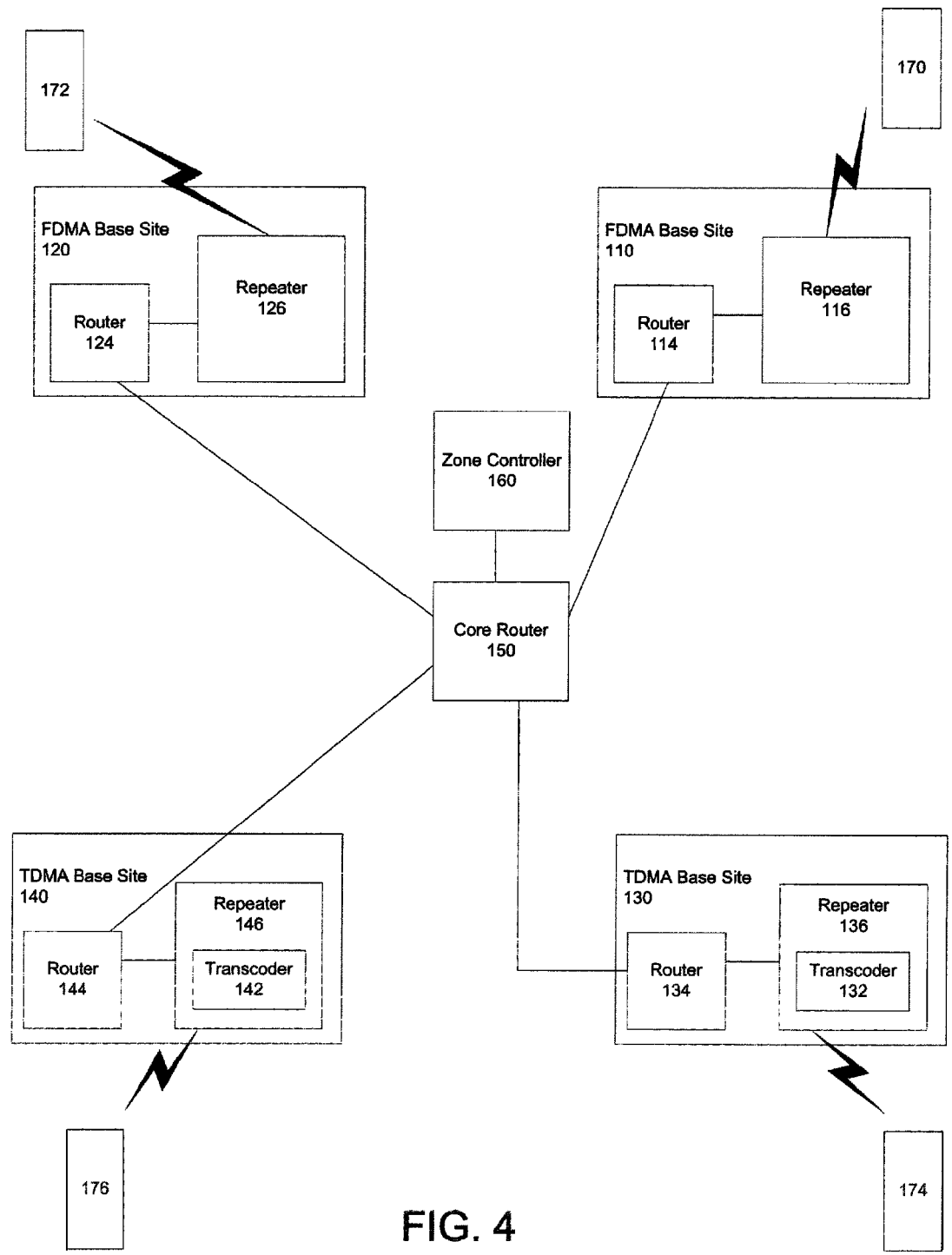
FIG. 4 shows a second embodiment of a communication system according to the present disclosure.

FIG. 4 illustrates another embodiment of a system according to the present disclosure. Unlike the system of FIG. 1, only the TDMA base sites 130 and 140 include a transcoder in this embodiment. This system may be used, for example, when TDMA base sites are added to a communication system having preexisting FDMA sites that are either not implemented with or upgraded to include transcoders.

Since the TDMA base sites 130 and 140 in this embodiment include transcoders, the process for transmitting voice signals from a Phase 1 communication unit remains similar to that described in FIG. 3. Specifically, a transcoder at each TDMA base site transcodes a received full-rate encoded audio signal into a half-rate encoded audio signal, and the transcoded half-rate encoded audio signal is then broadcast by each TDMA base site.

Figure 5:
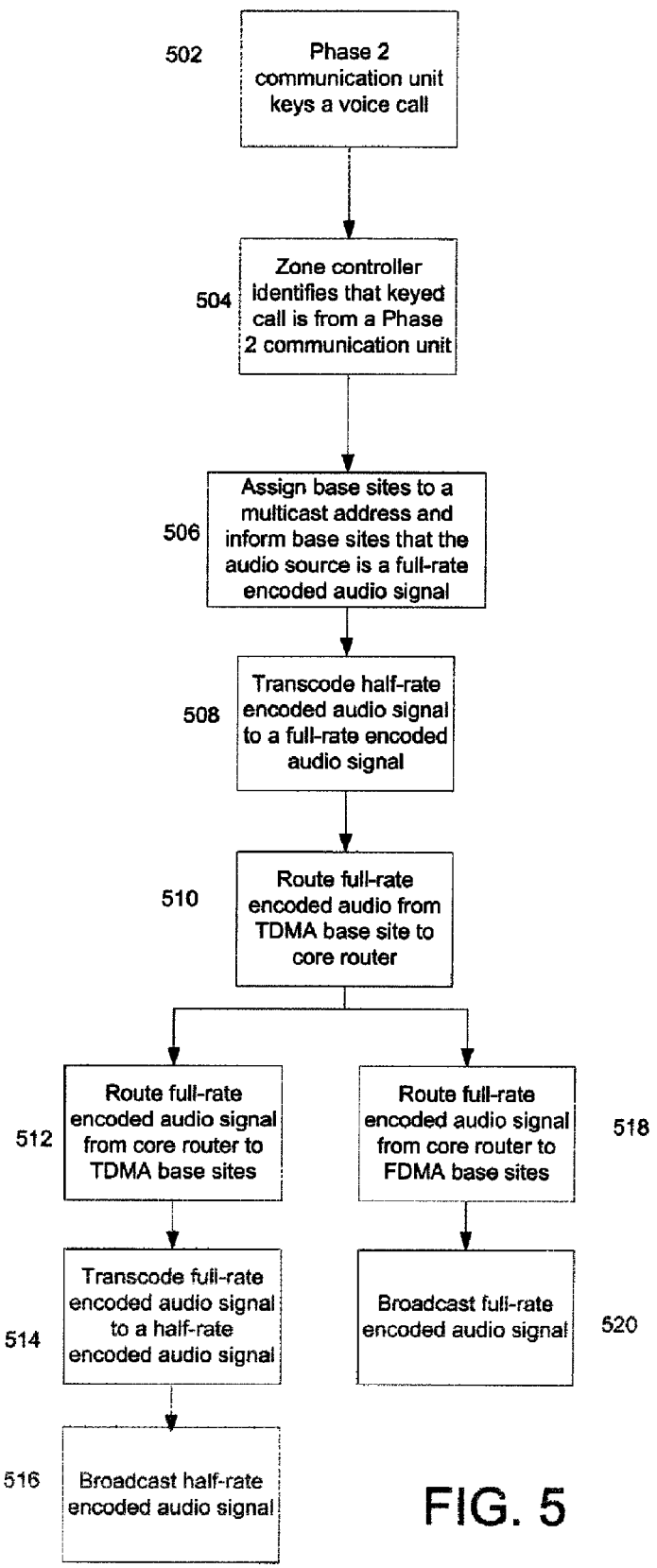
FIG. 5 shows one embodiment of a method for transmitting voice signals in the communication system of FIG. 4 according to the present disclosure.

The process for transmitting voice signal from a Phase 2 communication unit in FIG. 3, however, differs from the system of FIG. 1. In particular, as shown in FIG. 5, the process for transmitting a voice call from a Phase 2 communication unit in the system of FIG. 4 may require two transcoding steps.

In step 502, Phase 2 communication unit 174, which is in wireless communication with the repeater 136 in the first TDMA base site 130, keys a voice call. In step 504, the zone controller 160 identifies that the voice call was keyed by a Phase 2 communication unit at a TDMA base site. In step 506, the zone controller 160 assigns base sites 110, 120, 130, and 140 to the same multicast address, and informs the base sites 110, 120, 130 and 140 that the audio transmission is to be in the full-rate encoding format. In step 508, the transcoder 132 at the first TDMA base site 130 transcodes the half-rate encoded audio signal received from the communication unit 174 to a full-rate encoded audio signal. In step 510, the first TDMA base site 130 routes the full-rate encoded audio signal received from the communication unit 174 to the core router 150.

In step 512, the core router 150 then routes the full-rate encoded audio signal to the second TDMA base site 140. In step 514, the transcoder 142 at the second TDMA base site 140 transcodes the full-rate encoded audio signal back into a half-rate encoded audio signal. In step 516, the repeater 146 at the TDMA base site 140 then broadcasts the half-rate encoded audio signal for reception by the Phase 2 communication unit 176.

At the same time that the audio signal is routed to second TDMA base site in step 512, the core router 150 also routes the full-rate encoded audio signal to the FDMA base site 110 and 120 in step 518. In step 520, each of the repeaters 116 and 126 at the FDMA base sites 110 and 120 broadcasts the received full-rate audio signal without having to perform any transcoding at the FDMA base site.

Figure 6:
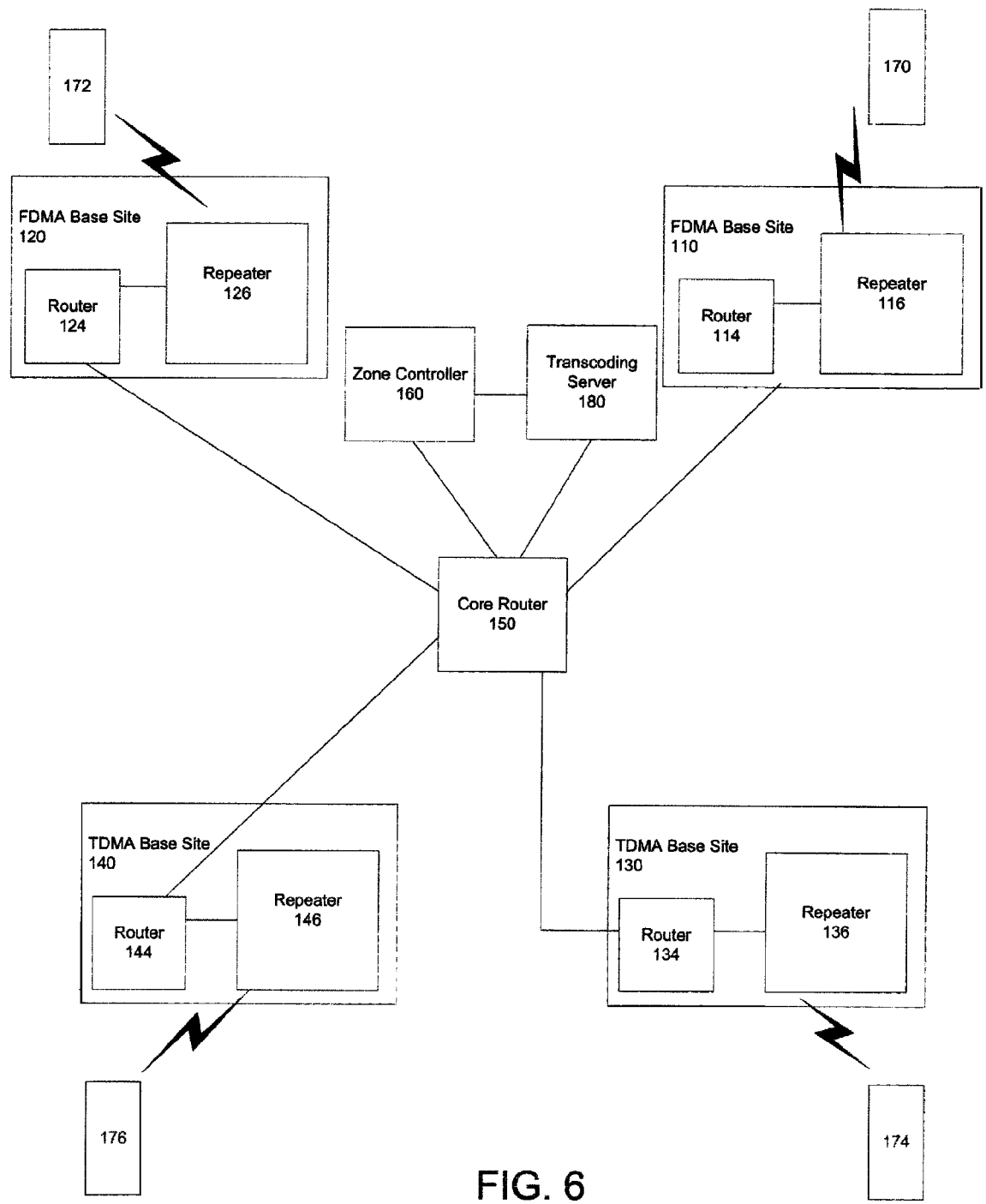
FIG. 6 shows a third embodiment of a communication system according to the present disclosure.

FIG. 6 illustrates yet another embodiment of a system according to the present disclosure. In this embodiment, none of the base sites 112, 120, 130 or 140 incorporate a transcoder. Instead, the transcoder is provided as a stand-alone transcoding server 180. As shown in FIG. 6, the transcoding server 180 is remote from each of the base sites and may be coupled, via Ethernet, to the zone controller 160 and/or the core router 150.

By using a stand-alone transcoding server 180, prior-existing base sites in a system need not be upgraded with transcoders, a process that may be costly and time consuming. Additionally, voice calls are often encrypted before being sent by a communication unit. When transcoding is performed on an encrypted signal, the signal must be decrypted prior to being transcoded, and then preferably encrypted again so that security of the signal is maintained throughout the system. Although the decryption and re-encryption may be performed by the transcoders in the embodiments shown in FIGS. 1 and 4, it is often desirable that such functions be performed at a secure location remote from the base site locations.

Figure 7:
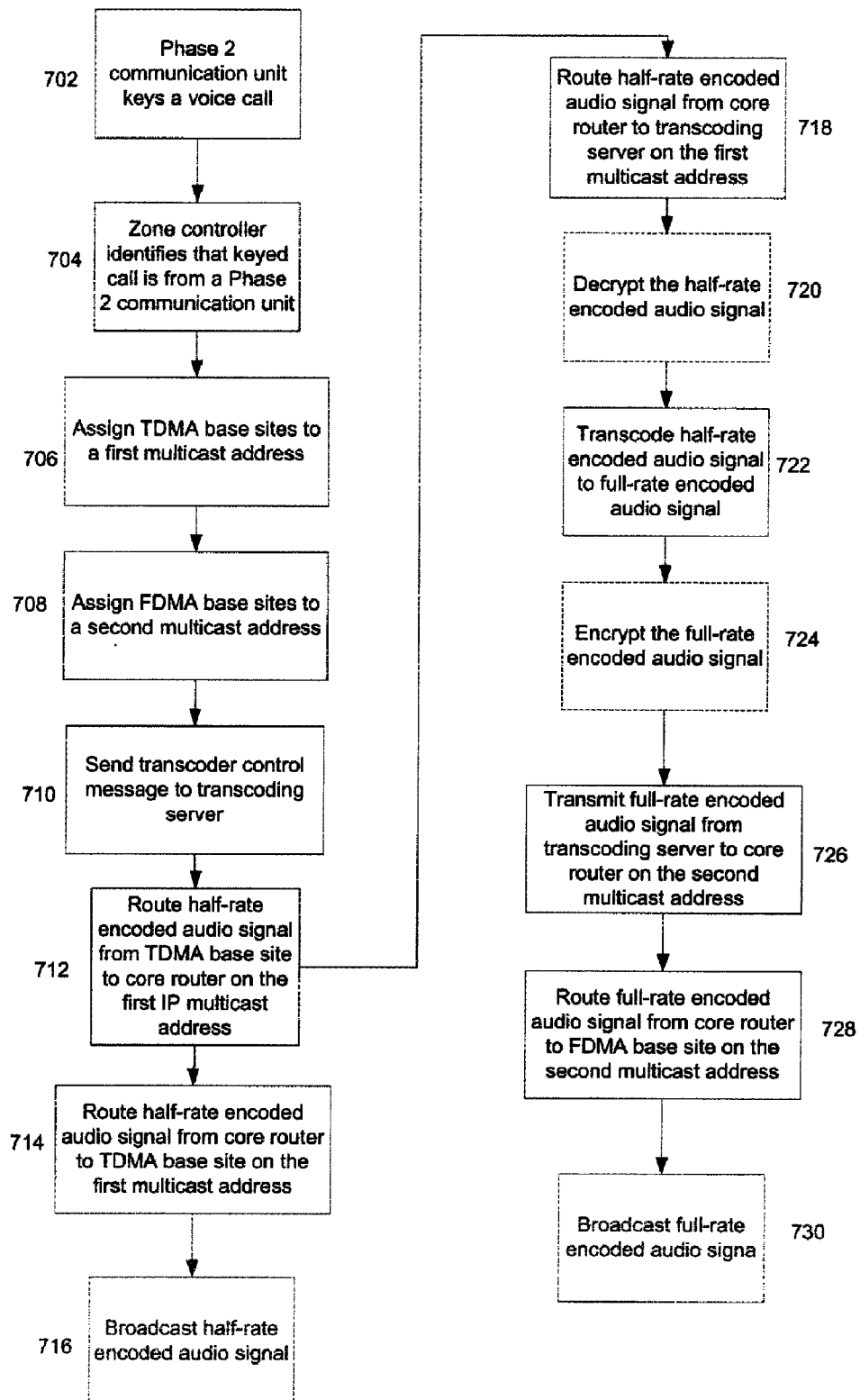
FIG. 7 shows one embodiment of a method for transmitting voice signals in the communication system of FIG. 6 according to the present disclosure.

FIG. 7 shows one method for transmitting a voice call from a Phase 2 communication unit in FIG. 6. In step 702, the Phase 2 communication unit 174, which is in wireless communication with the repeater 136 at the first TDMA base site 130, keys a voice call. In step 704, the zone controller 160 identifies that the voice call was keyed by a Phase 2 communication unit at a TDMA base site. In step 706, the zone controller 160 sends a channel assignment message assigning the TDMA base sites 130 and 140 to use a first multicast address. In step 708, the zone controller 160 also sends a control assignment message assigning the FDMA base sites 110 and 120 to use a second multicast address. In step 710, the zone controller 160 also sends a transcoder control message to the transcoding server 180. The transcoder control message instructs the transcoding server 180 that it is to receive a half-rate encoded audio signal on the first multicast address, transcode the audio transmission to a full-rate encoded audio signal, and then transmit the full-rate encoded audio signal on the second IP multicast address.

In step 712, first TDMA base site 130 transmits a half-rate encoded audio signal received from the communication unit 174 to the core router 150 using the first multicast address. In step 714, the core router 150 then routes the half-rate encoded audio signal to the second TDMA base site 140 using the first IP multicast address. In step 716, the repeater 146 at the second TDMA base site 140 broadcasts the half-rate encoded audio signal for reception by the Phase 2 communication unit 176.

In step 718, the half-rate encoded audio signal received by the core router 150 in step 712 is also routed to the transcoding server 180 on the first multicast address. The transcoding server 180 then begins the process of transcoding the received audio signal per the control message received from the zone controller 160. First, if the audio signal received by the transcoding server 180 is encrypted, the transcoding server 180 decrypts the audio signal in step 720. In step 722, the transcoding server 180 transcodes the half-rate encoded audio signal to a full-rate encoded audio signal. If the audio was decrypted in step 720, the transcoding server 180 may then re-encrypt the full-rate encoded audio signal in step 724. Of course, if the audio transmission received by the transcoding server 180 was not encrypted, steps 720 and 724 need not be performed.

In step 726, the transcoding server 180 transmits the full-rate encoded audio signal to the core router 150 on the second multicast address. In step 728, the core router 150 routes the full-rate encoded audio signal to the FDMA base sites 110 and 120 on the second multicast address. In step 730, the repeaters 116 and 126 at the FDMA base sites 110 and 120 broadcast the full-rate encoded audio signal for reception by the Phase 1 communication units 170 and 172, respectively.

Figure 8:
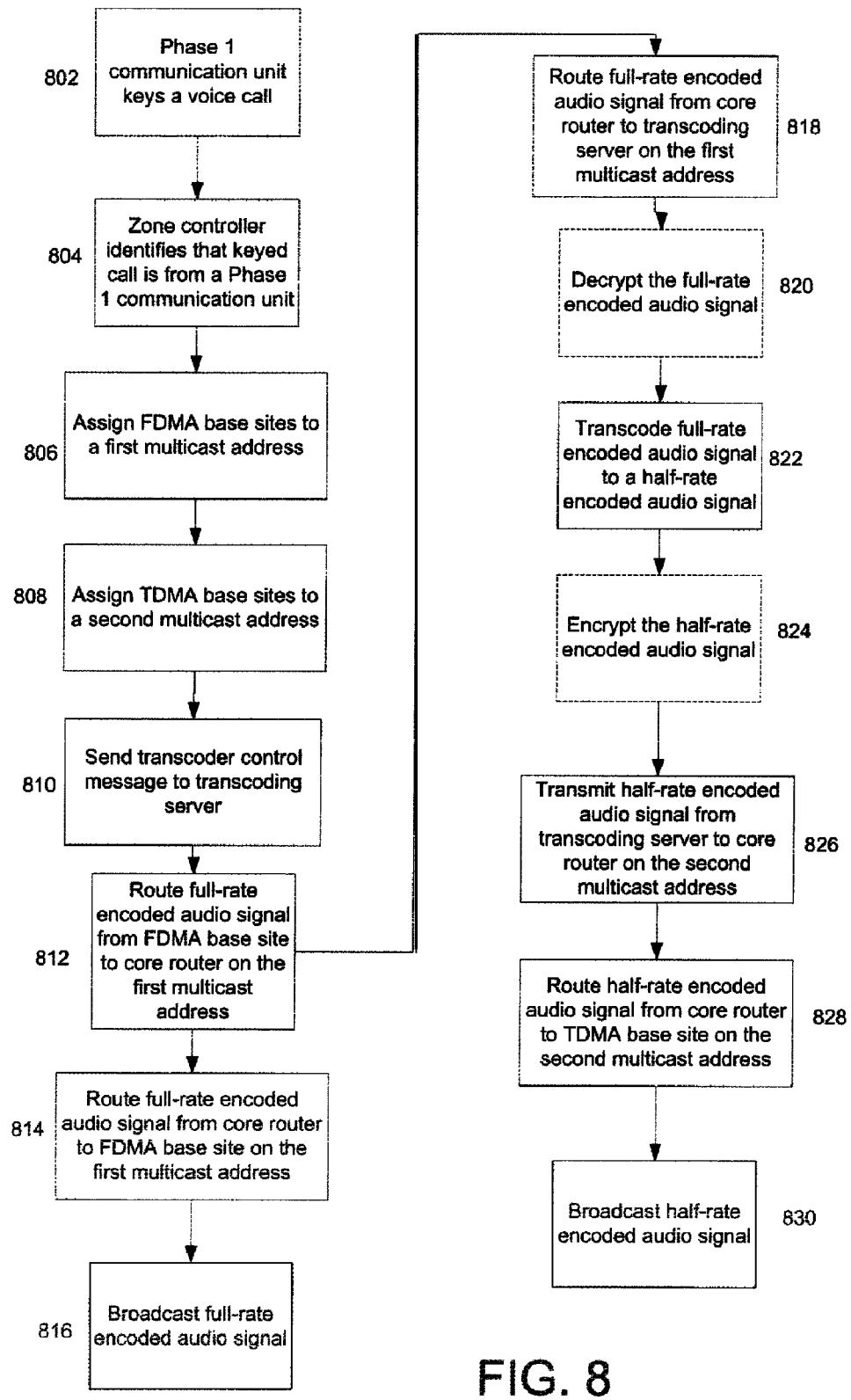
FIG. 8 shows another embodiment of a method for transmitting voice signals in the communication system of FIG. 6 according to the present disclosure.

FIG. 8 then shows one method for transmitting a voice call from a Phase 1 communication unit in FIG. 6. In step 802, the Phase 1 communication unit 170, which is in wireless communication with the repeater 116 at the first FDMA base site 110, keys a voice call. In step 804, the zone controller 160 identifies that the voice call was keyed by a Phase 1 communication unit. In step 806, the zone controller 160 assigns FDMA base sites 110 and 120 to use a first multicast address. In step 808, the zone controller 160 assigns TDMA base sites 130 and 140 to use a second multicast address. In step 810, the zone controller 160 also sends a transcoder control message to the transcoding server 180. The transcoder control message instructs the transcoding server 180 that it is to receive a full-rate encoded audio signal on the first multicast address, transcode the full-rate encoded audio signal to a half-rate encoded audio signal, and then transmit the half-rate encoded audio on the second multicast address.

In step 812, the first FDMA base site 110 transmits the full-rate encoded audio signal received from the communication unit 170 to the core router 150 on the first multicast address. In step 814, the core router 150 routes the full-rate encoded audio signal to the second FDMA base site 120 on the first multicast address. In step 816, the repeater 126 at the second FDMA base site 120 broadcasts the full-rate encoded audio signal for reception by the Phase 1 communication unit 172.

In step 818, the full-rate encoded audio signal received at the core router 150 in step 812 is also routed to the transcoding server 180 on the first multicast address. The transcoding server 180 then begins the process of transcoding the received audio per the control message received from the zone controller 160. First, if the audio signal received by the transcoding server 180 is encrypted, the transcoding server 180 may decrypt the audio (step 820). In step 822, the transcoding server 180 transcodes the full-rate encoded audio signal to a half-rate encoded audio signal. If the audio was originally encrypted, the transcoding server 180 re-encrypts the half-rate encoded audio signal in step 824.

In step 826, the transcoding server 180 transmits the half-rate encoded audio signal to the core router 150 on the second multicast address. In step 828, the core router 150 routes the half-rate encoded audio signal to the TDMA base sites 130 and 140 on second IP multicast address. In step 830, the repeaters 136 and 146 at the TDMA base sites 130 and 140 broadcast the half-rate encoded audio signal for reception by the Phase 2 communication units 174 and 176, respectively.

Although the above embodiments are illustrated using transmissions between multiple base sites, it should be understood that the present disclosure is also applicable to a single base site having various types of repeaters. For example, as noted above, a single base site may include both FDMA Phase 1 compliant repeaters and TDMA Phase 2 compliant repeaters. In such a system, a full-rate encoded audio signal may be received by a FDMA repeater at a base site, transcoded to a half-rate audio signal, and then broadcast by a TDMA repeater at the same base site. Similarly, a half-rate encoded audio signal may be received by a TDMA repeater at a base site, transcoded to a full-rate audio signal, and then broadcast by a FDMA repeater at the same base site. As with the embodiments above, the transcoder may be located at the base site or in a remote transcoding server.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for transmitting voice calls in a communication system comprising the steps of:
   receiving, at a first set of base site repeaters capable of communicating with a communication unit using a first encoding format, an assignment to use a first multicast address;
   receiving, at a second set of base site repeaters capable of communicating with a communication unit using a second encoding format that is different from the first encoding format, an assignment to use a second multicast address that is different from the first multicast address;
   routing an audio signal that was encoded using the first encoding format to each base site repeater in the first set and to a transcoding server;
   at each base site repeater in the first set, broadcasting the audio signal that was encoded using the first encoding format;
   transcoding the audio signal that was encoded using the first encoding format to an audio signal encoded using the second encoding format;
   routing the audio signal that was encoded using the second encoding format to each base site repeater in the second set, wherein the audio signal that was encoded using the first encoded format is routed in the communication system using the first multicast address, and the audio signal that was encoded using the second different encoding format is routed in the same communication system using the second different multicast address; and
   at each base site repeater in the second set, broadcasting the audio signal that was encoded using the second encoding format.

2. The method of claim 1 wherein a source of the audio signal is a single communication unit using the first encoding format.

3. The method of claim 1 further comprising the step of transmitting the audio signal that was encoded using the first encoding format to a router using the first multicast address.

4. The method of claim 1 further comprising the step of receiving, at the transcoding server, an indication that the audio signal that will be received was encoded using the first encoding format.

5. The method of claim 1 further comprising the step of, at the transcoding server:
   prior to the step of transcoding, receiving the audio signal that was encoded using the first encoding format on the first multicast address; and
   after the step of transcoding, transmitting the audio signal that was encoded using the second encoding format on the second multicast address.

6. The method of claim 1 wherein the audio signal that was encoded using the first encoding format is encrypted, and further comprising the steps of, at the transcoding server:
   prior to the step of transcoding, receiving the audio signal that was encoded using the first encoding format on the first multicast address, and decrypting the audio signal that was encoded using the first encoding format; and
   after the step of transcoding, encrypting the audio signal that was encoded using the second encoding format, and transmitting the audio signal that was encoded using the second encoding format on the second multicast address.

7. The method of claim 1 wherein the first encoding format encodes the audio signal using an advanced multi-band excitation (AMBE) full-rate vocoder, and wherein the second encoding format encodes the audio signal using an AMBE half-rate vocoder.

8. The method of claim 1 wherein the first encoding format encodes the audio signal using an advanced multi-band excitation (AMBE) half-rate vocoder, and wherein the second encoding format encodes the audio signal using an AMBE full-rate vocoder.

9. The method of claim 1 wherein at least some of the first set of base site repeaters and at least some of the second set of base site repeaters are included in a single base site.

10. A system for transmitting voice calls in a communication system comprising:
- a first set of base site repeaters capable of communicating with a communication unit using a first encoding format;
- a second set of base site repeaters capable of communicating with a communication unit using a second encoding format that is different from the first encoding format;
- a router, coupled to each base site repeater in the first set and the second set; and
- a transcoding server, coupled to the router;
- wherein each base site repeater in the first set receives an assignment to use a first multicast address, and each base site repeater in the second set receives an assignment to use a second multicast address that is different from the first multicast address, and
- wherein the router routes an audio signal that was encoded using the first encoding format to each base site repeater in the first set and to the transcoding server, and
- wherein each base site repeater in the first set broadcasts the audio signal that was encoded using the first encoding format, and
- wherein the transcoding server receives the audio signal that was encoded using the first encoding format on the first multicast address, transcodes the audio signal that was encoded using the first encoding format to an audio signal that was encoded using the second encoding format, and transmits the audio signal that was encoded using the second encoding format to the router using the second multicast address, and
- wherein the router routes the audio signal that was encoded using the second encoding format to each base site repeater in the second set, wherein the audio signal that was encoded using the first encoded format is routed in the communication system using the first multicast address, and the audio signal that was encoded using the second different encoding format is routed in the same communication system using the second different multicast address, and
- wherein each base site repeater in the second set broadcasts the audio signal that was encoded using the second encoding format.

11. The system of claim 10 further comprising a zone controller, coupled to the router and to the transcoding server, wherein the zone controller transmits the assignment to each base site repeater in the first set to use the first multicast address, and transmits the assignment to each base site repeater in the second set to use the second multicast address.

12. The system of claim 10 wherein the transcoding server receives an indication that the audio signal that will be received was encoded using the first encoding format.

13. The system of claim 10 wherein the transcoding server receives instructions to receive the audio signal that was encoded using the first encoding format on the first multicast address, and to transmit the audio signal that was encoded using the second encoding format on the second multicast address.

14. The system of claim 10 further comprising a plurality of communication units, selectively coupled to at least one of the base site repeaters, wherein one of the communication units using the first encoding format is a source of the audio signal.

15. The system of claim 14 wherein the base site repeater in the first set that is coupled to the source of the audio signal transmits the audio signal that encoded using the first encoding format to the router using the first multicast address.

16. The system of claim 10 wherein the audio signal that was encoded using the first encoding format is encrypted, and wherein the transcoding server further:
- decrypts the audio signal that was encoded using the first encoding format prior to transcoding the audio signal that was encoded using the first encoding format to the audio signal that was encoded using the second encoding format, and
- encrypts the audio signal that was encoded using the second encoding format prior to transmitting the audio signal that was encoded using the second encoding format to the router using the second multicast address.

17. The system of claim 10 wherein at least some of the first set of base site repeaters and at least some of the second set of base site repeaters are included in a single base site.

18. The system of claim 10 wherein the first encoding format encodes the audio signal using an advanced multi-band excitation (AMBE) full-rate vocoder, and wherein the second encoding format encodes the audio signal using an AMBE half-rate vocoder.

19. The system of claim 10 wherein the first encoding format encodes the audio signal using an advanced multi-band excitation (AMBE) half-rate vocoder, and wherein the second encoding format encodes the audio signal using an AMBE full-rate vocoder.

20. The system of claim 10 wherein the transcoding server is remote from the first set of base site repeaters and the second set of base site repeaters.

* * * * *